United States Patent Office 3,454,543
Patented July 8, 1969

3,454,543
METAL SEALANT CONTAINING AMINOALKOXY-
ALKYLAMINE ACCELERATOR
Charanjit Rai, Bellwood, and Arthur Frederic Krueger,
Villa Park, Ill., assignors to Broadview Chemical Corporation, a corporation of Illinois
No Drawing. Filed June 29, 1966, Ser. No. 561,387
Int. Cl. C09k 3/10; C08f 1/60, 1/76
U.S. Cl. 260—86.1
9 Claims

ABSTRACT OF THE DISCLOSURE

Aminoalkoxyalkylamine compounds are used as accelerators in shelf stable acrylic sealant compositions containing a peroxidic initiator.

This invention relates to accelerating the cure of room temperature sealants containing liquid monomer-catalyst mixtures which are shelf stable but capable of setting up at room temperature on confinement between closely facing metal surfaces to adhere the surfaces to each other.

Briefly, the present invention involves the use of aminoalkoxyalkylamine compounds as accelerators for shelf stable sealant compositions containing a room temperature reactive monomer and a catalyst system for initiating polymerization of the monomer at room temperature.

Shelf stable metal sealant compositions have been formulated for the purpose of bonding closely facing metal surfaces, e.g. threaded joints, in a full range of varying strengths, viscosity, thixotropy and curing or setting rates. Such sealant compositions usually include a room temperature reactive acrylic monomer which is capable of being cured at room temperature within the desired period of time. For example, the acrylic monomer may be an acrylic diester of an ethylene glycol, e.g. a polyethylene glycol as described by L. W. Kalinowski in United States Patent No. 3,249,656 entitled, "Sealant Composition," issued May 3, 1966; an acrylic ester of a cyclic ether alcohol as described by J. R. Stapleton in application Ser. No. 517,321, entitled "Adhesive Composition for Metals and the Like," filed Dec. 29, 1965; an acrylic ester of an amino alcohol such as described in our copending application Ser. No. 561,381, entitled "Metal Sealant Containing Amino Acrylic Ester," filed June 29, 1966, and/or mixtures of the above with each other or with other vinylic monomers such as allylic monomers. The disclosures of monomers and the specific examples of such monomers described in the above identified patent applications are hereby incorporated in this application by reference as examples of sealant compositions which are useful in the practice of the present invention as set out herein. The room temperature reactive monomers are used in an amount sufficient to complete the desired room temperature curing reaction when the catalyzed sealant is confined between the closely facing metal surfaces.

The catalysts for sealant compositions with which the present invention is concerned are usually peroxidic catalysts. Although t-butyl hydroperoxide is a common and conventional peroxidic initiator for ethylenic polymerization generally, it is difficult to initiate polymerization of compositions using t-butyl hydroperoxide and it is also difficult to provide high strength grades while still maintaining shelf stability.

It is a general object of this invention to provide new and useful adhesive compositions of the class described; and it is a more particular object to provide a new and useful accelerator system for such adhesives or sealants.

It is another object of this invention to provide new and useful liquid sealant compositions which will set up at room temperature in contact with closely facing metal surfaces within a reasonable time to provide a bond having excellent strength.

Still another object of this invention is to provide a high strength sealant composition which has good stability and an acceptable rate of room temperature cure.

A further object of this invention is to provide a new and useful sealant composition employing a highly advantageous accelerator system.

A more particular object of this invention is to provide an accelerator system which is compatible with and useful in combination with t-butyl hydroperoxide, as well as other peroxidic catalysts, for accelerating room temperature cure without materially adversely affecting room temperature storage life of the mixed monomer hydroperoxide and accelerator.

Other objects of this invention will be apparent from the descriptions given herein:

The useful aminoalkoxyalkylamine compounds have the formula $R_1$—$N(H)R_2[OR_3]_xN(H)R_4$ wherein $x$ is an integer 1 to 6 inclusive, each of $R_1$ and $R_4$ is hydrogen or lower alkyl, e.g. $C_1$ to $C_6$ inclusive, and each of $R_2$ and $R_3$ represents a lower alkyl bridge, e.g. $C_1$ to $C_6$. Specific examples of suitable aminoalkoxyalkylamine compounds as N,N'-dimethyl triethylene glycol diamine, N, N'-diethyl diethylene glycol diamine, N,N'-diethyl hexaethylene glycol diamine, di-6-(methylamino)hexyl ether of 1,6-hexanediol, di-6-(hexylamino)octyl ether of ethylene glycol, methylaminomethyloxyhexylaminohexane, ene glycol, methylaminomethyloxyhexylaminohexane, aminopropoxyethyl amine, aminomethoxypropyl amine, methylaminomethoxypropyl amine, aminomethoxymethyl amine, hexylaminohexyloxyhexyl amine, 2-aminoethoxy-3,4-dimethyl hexyl amine, methylaminobutoxybutoxy amine, aminoethoxyethoxyhexyl amine, aminobutoxyhexyloxyhexyloxy butyl amine, etc.

To prepare the present sealant compositions, it is merely necessary to mix a suitable amount of aminoalkoxyalkylamine compound and peroxide catalyst with the selected reactive monomer or mixture of monomers. Metal containers should not be used because of the chance of premature polymerization. It has been found that the peroxide catalyst, e.g. organic peroxide, including hydroperoxides and peresters, or hydrogen peroxide, can be used, e.g. in amounts of .1 to 10 or 15% or more, preferably 1 to 8%, and usually 1 to 3% in the sealant composition. The amount of accelerator may vary from .01 to 10 or more weight percent and an optimum can usually be found between .1 and 5 weight percent depending on the monomer system and peroxide catalyst used. The preferred amount of accelerator is .5 to 2%.

Examples of suitable organic peroxides are cumene hydroperoxide, t-butyl hydroperoxide, methylethylketone hydroperoxide or peroxide, tetralin hydroperoxide, benzoyl peroxide, lauroyl peroxide, ditertiary butyl diperphthalate, and the like. Tertiary butyl hydroperoxide can be advantageously used.

Inhibitors or stabilizers can be added as needed to balance or prevent instability of the sealant. Hydroquinones and its ethers, such as p-methoxy phenol are preferred inhibitors and stabilizers because of their availability and effectiveness to inhibit until it is desired to set up sealant composition between the closely facing metal surfaces in the absence of air. Hydroquinone, or an ether thereof, in a total amount of 25 to 1000 p.p.m., more usually 50 to 400 p.p.m., will probably be sufficient to stabilize most sealant compositions containing the ester. Other conventional inhibitors or stabilizers for inhibiting polymerization of vinyl compounds can be used as will be apparent to those in the art.

It is intended that other polymerizable unsaturated esters or other unsaturated monomers such as hydrocarbons, ethers, or other comonomers, or plasticizers such as diisodecyl phthalate or the monobutyl ether of ethylene glycol, can be included in the present sealant compositions to modify the properties of the composition.

Preferred sealant compositions also include a minor amount, e.g. up to 50% of a low molecular weight polymer of an allyl ester of an aromatic polycarboxylic acid,

| Code Number | Composition |
| --- | --- |
| 210 | Polyethylene glycol dimethacrylate (averages tetraethylene glycol dimethacrylate). |
| 1201 | Cyclohexyl methacrylate. |
| 1212 | Dimethylaminoethyl methacrylate. |
| (2) Catalysts: | |
| 51 | Cumene hydroperoxide. |
| 55 | t-Butyl hydroperoxide. |
| (3) Cocatalysts: | |
| 0115 | N,N-dimethyl formamide. |
| 0158 | Benzoic sulfimide (saccharin). |
| (4) Sealant base batch: | |
| 1,000 | A batch made by mixing 20 pounds of ethylene glycol dimethacrylate with 20 pounds of a premix (hereafter identified as premix) containing 73.7% 210 (identified above) and 26.3% diallyl phthalate prepolymer (a solid prepolymer marketed under the name Dapon 35) and inhibited with 100 p.p.m. hydroquinone, and then adding and mixing in 182 g. (about 1%) acrylic acid and 60 g. (about 0.3%) benzoic sulfimide. |

TABLES OF EXAMPLES

| Ingredients | Example number | | | | | | | | | | | | | |
| --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 |
| (1) Monomers:[1] | | | | | | | | | | | | | | |
| 0131 | | | | | | 50 | | | | | | | | |
| 0132 | | | | | | | 50 | | | | | | | |
| 0133 | | | | | | | | | | | | 50 | 50 | |
| 203 | 100 | 50 | 100 | 100 | | | 50 | 70 | | | 50 | | | 50 |
| 210 | | 50 | | | 50 | 50 | | | | 50 | 50 | | | 50 |
| 1201 | | | | | 50 | | | | 30 | | | | | |
| 1212 | | | | | 50 | | | 50 | | 50 | | | | |
| (2) Catalysts: | | | | | | | | | | | | | | |
| 51 | x | | | | | | | | | | | | | |
| 55 | | x | x | x | x | x | x | x | x | x | x | x | x | x |
| (3) Cocatalysts, percent: | | | | | | | | | | | | | | |
| 0115 | | | | | | | | | | 0.3 | | | | |
| 158 | 0.3 | | 0.3 | | 0.3 | 0.3 | | | | | | | | |
| (4) Base Batch:[1] | | | | | | | | | | | | | | |
| 1,000 | | | | | | | | | | | | | 100 | |

[1] Reported as parts by weight.

hereinafter referred to as allylic prepolymer, which is soluble in and copolymerizeable with the reactive acrylic monomer. These compositions may be conveniently prepared by premixing the acrylic monomer and allylic prepolymer to provide a generally homogeneous mixture preferably prior to addition of catalyst and accelerator. An allylic prepolymer having desirable characteristics is diallyl phthalate which can be obtained under the name "Dapon 35" from Food Machinery Corporation, having the following reported physical properties:

Bulk density _____lbs./cu. ft._____ 14—16
Sp. gr. at 25° C. _____ 1,267
Iodine No. _____ 57
Softening range _____C____ 85+115

The compositions of this invention are useful in adhering closely facing surfaces, usually metal, to each other. Close contact of the sealant composition with the metal surfaces apparently results in initiating the cure of the monomer by the catalyst and accelerator.

The following examples are offered for the purposes of illustration and are not intended as limiting the invention:

Example 1 to 14

In each of these examples, the monomer or base batch ingredients in the amounts indicated in the table below were thoroughly mixed. Two percent N,N'-dimethyl triethylene glycol diamine accelerator was added and mixed, followed by adding and mixing in the cocatalyst (where indicated) and then about 2.5% t-butyl hydroperoxide or cumene hydroperoxide (as indicated) as catalyst. For ease of reporting the formulations and results, various monomers, catalysts, cocatalysts and a sealant base batch have been given code numbers as follows:

| Code Number | Composition |
| --- | --- |
| (1) Monomers: | |
| 0131 | Isobutyl methacrylate. |
| 0132 | n-Butyl methacrylate. |
| 0133 | Mixed mono- and di-methacrylates of 2,2,4-trimethylpentanediol. |
| 203 | Tetrahydrofurfuryl methacrylate. |

The formulations of Examples 1 through 17 were subjected to a "finger-tight" locking test. Accordingly, 3 small drops of each formulation were dispensed on the exposed threads of a plurality of separate degreased 3/8–24, 1 inch medium carbon steel cap screws on each of which a degreased medium carbon steel nut had been threaded up close to the cap screw head. The nut was then backed off until it was within the area of threads to which the formulation had been applied. The cap screw was then placed head down on a level surface and allowed to stand. Every 30 minutes a different cap screw for each formulation was checked until one was found to be "finger tight," i.e. the nut could not be manually turned relative to the cap screw without the aid of a wrench or other tool.

Accelerated shelf life tests were also conducted on samples of Examples 1–17 in order to determine the storage stability of representative compositions. In accordance with the test procedure, each composition, in its polyethylene bottle, was aged in an oven maintained at about 81° to 82° C. If the composition gelled, the time was noted. The test is an accelerated aging test and, as a correlation of the test procedure with actual storage conditions, a sealant composition free from gelling after 30 minutes under the aging conditions of the test will also be free from gelling under ambient or room temperature for at least one year. The samples were checked every 30 minutes and the test was discontinued after 90 minutes. The data reported below indicates the sample survival time without gelling.

Additional cap screws were prepared as above for some of the examples for the purpose of testing the strength of the bonds between the nuts and cap screws after 24 hours. After expiration of the time interval, the head of the appropriate cap screw was held in a vise with the shank of the cap screw disposed vertically. A torque wrench was applied to the nut, and the torque required to dislodge the nut was noted. The results reported are an average of three to five tests.

The results of the "finger tight," 24 hour cure and stability tests are as follows:

TEST RESULTS

| Example | Time to "Finger Tight," min. | 24 Hour Torque, in./lb. | Stability 82° C., min. |
|---|---|---|---|
| 1 | 30 | 254 | 90 |
| 2 | 60 | 169 | 90 |
| 3 | 15 | 180 | 90 |
| 4 | 30 | 187 | 90 |
| 5 | 20 | 215 | 90 |
| 6 | 120 | 160 | 90 |
| 7 | 20 | 220 | 90 |
| 8 | 20 | 186 | 90 |
| 9 | 75 | 193 | 90 |
| 10 | 20 | 183 | 90 |
| 11 | 60 | 74 | 90 |
| 12 | 50 | 123 | 90 |
| 13 | 20 | 223 | 90 |
| 14 | 40 | 180 | 90 |

As still further examples of useful formulations, other similar aminoalkoxyalkylamine compounds as described generally above are substituted for the accelerators in any of the above examples with similar results. Thus, the examples of the invention encompass, but are not limited to, the use of all accelerators listed hereinabove.

As additional examples of suitable formulations, the above examples are repeated except that the monomer is replaced with polyethylene glycol diacrylate, tetrahydrofurfuryl chloracrylate, dimethylaminoethyl methacrylate, butylaminoethyl methacrylate, or other room temperature curing acrylic monomers or mixtures of such monomers. The aminoalkoxyalkylamine compounds have an accelerating effect on each such sealant formulation.

The sealant compositions of this invention can be used to bond similar or dissimilar metal surfaces. The surfaces are usually ferrous metal surfaces, although the compositions are useful in bonding such other metals as brass, copper and tin. Zinc and cadmium, used as corrosion-resistant coatings on other metals, are less active metals and may require the use of a primer to activate the metal before applying the sealant. Suitable such primers are available commercially.

Many advantages of the present sealant composition have been discussed above; briefly, there is provided a sealant composition which is shelf stable for an extended period of time but which sets up when closely contacted or confined between metal surfaces. The sealant compositions are receptive of and compatible with a variety of addition agents, including a full range of plasticizers, e.g., esters of phthalic acid, waxy plasticizers, etc., thixotroping agents such as a silica gel, e.g. Cab-O-Sil, and a variety of other monomers and soluble polymers.

It has previously been proposed by V. K. Krieble in U.S. Patent No. 3,041,322 to use "triorganoamines" as accelerators for t-butyl hydroperoxide polymerization of certain di- and tri-esters of acrylic acid and specific alkylene and polyalkylene glycols and glycerols, defined by a structural formula in that patent, in sealant compositions. This patent requires that the amine be one in which all three valences of the nitrogen atom are satisfied by carbon atoms, and that there be no hydrogen on the amine nitrogen. Also, in U.S. Patent No. 3,203,941, certain alkyl diamines and substituted alkyl diamines having a carbon-to-carbon chain of 2 to 3 atoms between nitrogens and substituted on the nitrogen only by alkyl, hydroxy alkyl or amino alkyl groups have been proposed for use in a separate primer component which will accelerate cure of the specific acrylic acid esters when mixed with the sealant composition during or shortly before application. These latter accelerators apparently render the sealant composition unstable. Thus, the acceptable amine-type accelerators used in shelf stable sealant compositions have been the triorganoamines in combination with the specific monomers of the above Krieble patents.

Also, again for use with the specific monomers of the Krieble formula, saccharin or other organic sulfimides are described as accelerators by Krieble in U.S. Patent No. 3,046,262; but, except when using certain heterocyclic secondary amines, N,N-dialkyl aryl amines or N,N-dialkyl substituted aryl amines, combined with a quinone or a monohydric or dihydric phenol having an alkyl group ortho to each hydroxy group, the sulfimides have always required an amine-free medium.

The present accelerators are in direct controversion of the above requirements since they are amines, i.e. diamines, which have hydrogen on the amine nitrogen and are not "triorganoamines," they still operate successfully as shelf stable compositions, and they are compatible with organic sulfimides.

All percentages given herein are percentages by weight unless otherwise indicated.

The foregoing detailed description is given for clearness of understanding only and no unnecessary limitations are to be understood therefrom, as some modifications will be obvious to those skilled in the art.

We claim:

1. A liquid sealant composition which is relatively stable under room temperature conditions in isolation from contact with metal surfaces and comprising a room temperature reactive acrylic ester monomer, a peroxidic initiator in an amount sufficient to initiate polymerization of said monomer at room temperature and an aminoalkoxyalkylamine compound having the formula $R_1-N(H)R_2[OR_3]_x N(H)R_4$ wherein $x$ is an integer 1–6 inclusive, each of $R_1$ and $R_4$ is selected from the class consisting of hydrogen and lower alkyl, and each of $R_2$ and $R_3$ is a lower alkyl linking bridge between N and O, in an amount sufficient to accelerate the polymerization of said monomer at room temperature on confinement of said sealant between closely facing metal surfaces without adversely affecting storage stability.

2. The composition of claim 1 wherein said aminoalkoxyalkylamine compound is bis[2-(methylamino)ethyl]ethylene glycol.

3. The composition of claim 1 wherein said aminoalkoxyalkylamine compound is present in an amount of from .1 to 5 weight percent based on said monomer.

4. The composition of claim 1 wherein said peroxidic initiator is an organic hydroperoxide.

5. The composition of claim 1 wherein said peroxide initiator is t-butyl hydroperoxide.

6. A laminate structure comprising separate members having closely facing ferrous metal surfaces and a layer of the composition of claim 1 set between said surfaces and securing said members as a unit.

7. A laminate structure comprising separate members having closely facing ferrous metal surfaces and a layer of the composition of claim 2 set between said surfaces and securing said members as a unit.

8. A method of adhering closely facing metal surfaces, which method comprises interposing between said surfaces the liquid composition of claim 1 and permitting said surfaces to stand at ambient conditions until said composition is set.

9. A method of adhering closely facing metal surfaces, which method comprises interposing between said surfaces the liquid composition of claim 2 and permitting said surfaces to stand at ambient conditions until said composition is set.

References Cited

UNITED STATES PATENTS

| 2,268,611 | 1/1942 | Mitchell | 260—89.5 |
| 2,464,826 | 3/1949 | Neher et al. | 260—86.1 |
| 3,046,262 | 7/1962 | Krieble | 260—89.5 |
| 3,249,656 | 5/1966 | Kalinowski et al. | 260—89.5 |

HARRY WONG, Jr., Primary Examiner.

U.S. Cl. X.R.

117—132; 138—143; 156—294, 306, 333; 161—189, 218; 260—89.5, 45.7, 45.95, 86.7, 31.8, 33.2, 80.81